Figure 1:
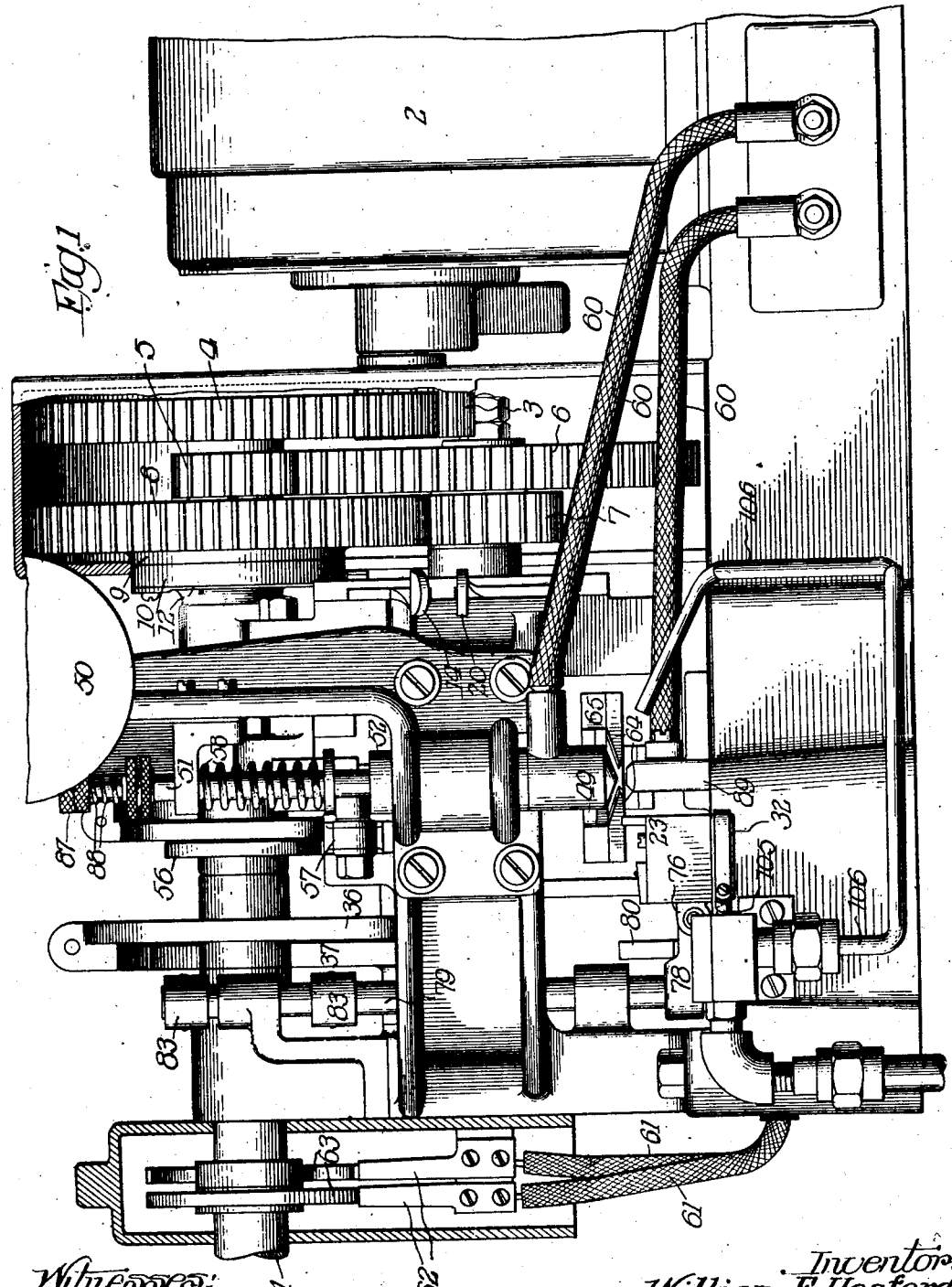

W. F. HOSFORD.
PROCESS AND MACHINE FOR FORMING AND AFFIXING SWITCH CONTACTS.
APPLICATION FILED OCT. 12, 1912.

1,090,619.

Patented Mar. 17, 1914.
10 SHEETS—SHEET 3.

Witnesses:
Geo. L. Davison
W. F. Hoffman

Inventor:
William F. Hosford.
by John G. Roberts
Atty.

W. F. HOSFORD.
PROCESS AND MACHINE FOR FORMING AND AFFIXING SWITCH CONTACTS.
APPLICATION FILED OCT. 12, 1912.

1,090,619.

Patented Mar. 17, 1914.
10 SHEETS—SHEET 4.

Witnesses:

Inventor:
William F. Hosford.

W. F. HOSFORD.
PROCESS AND MACHINE FOR FORMING AND AFFIXING SWITCH CONTACTS.
APPLICATION FILED OCT. 12, 1912.

1,090,619.

Patented Mar. 17, 1914.
10 SHEETS—SHEET 5.

Witnesses:
Fred C. Harrison
W. F. Hoffman

Inventor:
William F. Hosford.
John G. Roberts
Atty.

W. F. HOSFORD.
PROCESS AND MACHINE FOR FORMING AND AFFIXING SWITCH CONTACTS.
APPLICATION FILED OCT. 12, 1912.

1,090,619.

Patented Mar. 17, 1914.
10 SHEETS—SHEET 8.

Witnesses:

Inventor
William F. Hosford.
by

W. F. HOSFORD.
PROCESS AND MACHINE FOR FORMING AND AFFIXING SWITCH CONTACTS.
APPLICATION FILED OCT. 12, 1912.
1,090,619.
Patented Mar. 17, 1914.
10 SHEETS—SHEET 9.
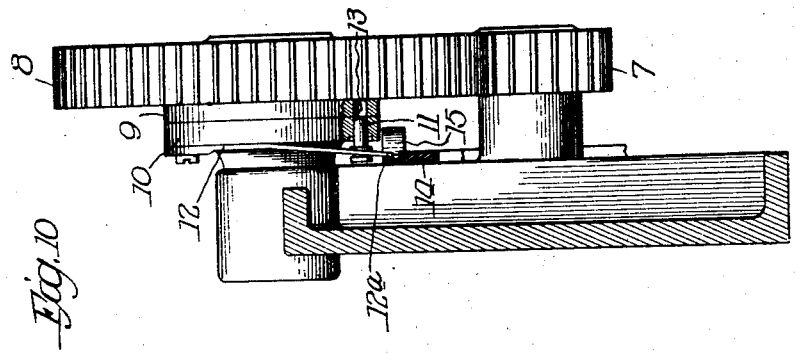
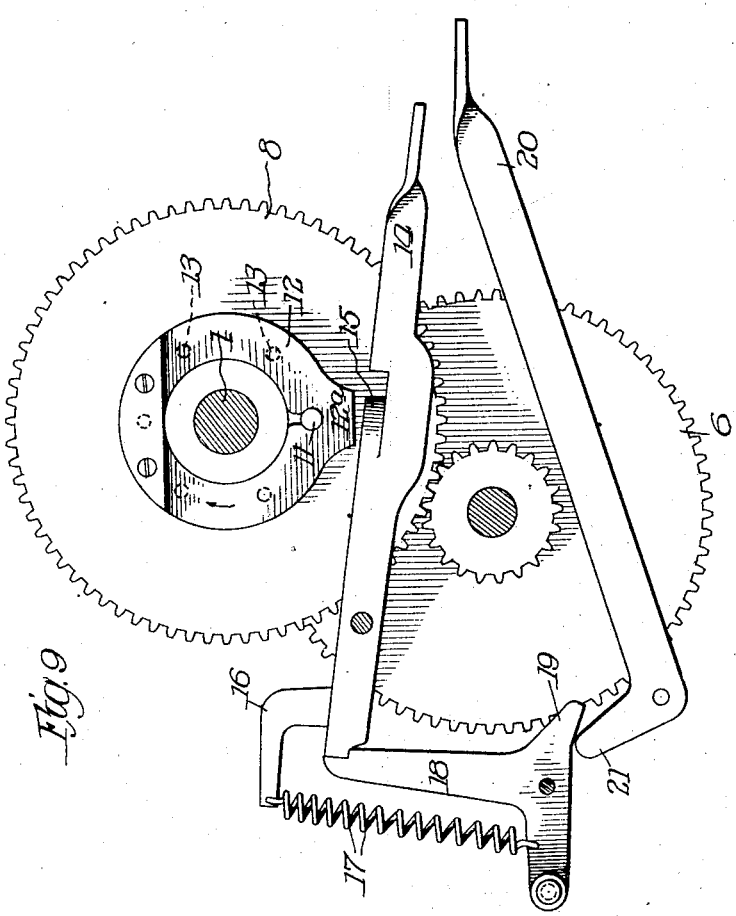

W. F. HOSFORD.
PROCESS AND MACHINE FOR FORMING AND AFFIXING SWITCH CONTACTS.
APPLICATION FILED OCT. 12, 1912.
1,090,619.
Patented Mar. 17, 1914.
10 SHEETS—SHEET 10.
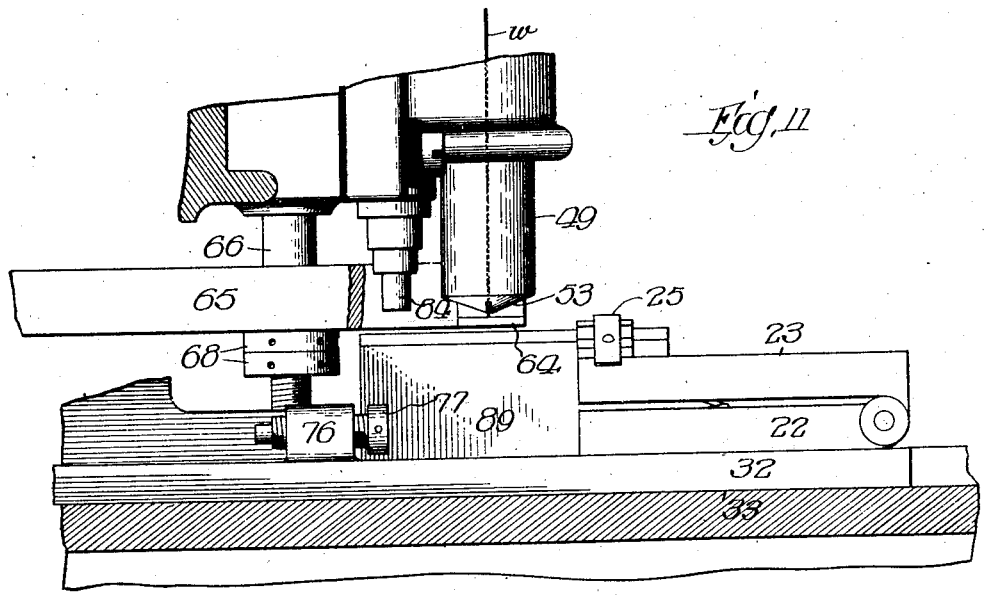
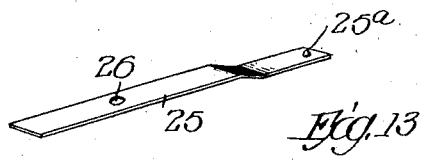
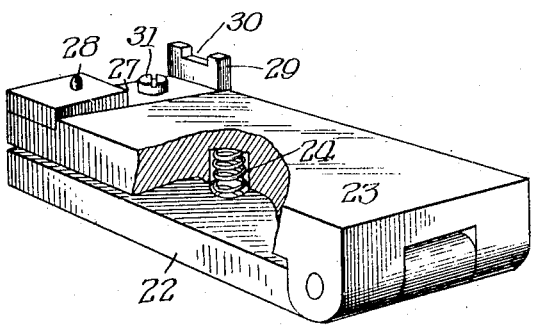
Witnesses:
Inventor:
William F. Hosford.
by John G. Roberts
Atty.

UNITED STATES PATENT OFFICE.

WILLIAM F. HOSFORD, OF CHICAGO, ILLINOIS, ASSIGNOR TO WESTERN ELECTRIC COMPANY, OF NEW YORK, N. Y., A CORPORATION OF ILLINOIS.

PROCESS AND MACHINE FOR FORMING AND AFFIXING SWITCH-CONTACTS.

1,090,619.  Specification of Letters Patent.  Patented Mar. 17, 1914.

Application filed October 12, 1912. Serial No. 725,533.

*To all whom it may concern:*

Be it known that I, WILLIAM F. HOSFORD, a citizen of the United States, residing at Chicago, in the county of Cook and State of Illinois, have invented certain new and useful Improvements in Processes and Machines for Forming and Affixing Switch-Contacts, of which the following is a full, clear, concise, and exact description.

My invention relates to a process of and a machine for electrically welding contacts or the like, as for example platinum contacts, to springs or other parts of electrical apparatus.

The object of my invention is to provide means by which contacts may be welded in such manner that uniform results are obtained, and the work done automatically, economically both with respect to material and labor, and with rapidity.

My invention contemplates a sequence of operations in which the end of a wire of platinum, or other material suitable for electrical contacts, is pressed against the surface of the work upon which the contact is to be affixed and said end of the wire welded thereto by the passage of an electric current through the wire and the work at their point of contact. After this welding operation the wire is cut, leaving a point of wire welded to the work. The next step in the sequence of operations is the shaping of the welded point, as for example giving it a conical point, a flat disk shape, or other desired form of contact surface.

In its preferred form, the machine which I employ in carrying out my invention comprises a reciprocating carriage which in its first movement carries the work beneath a hollow plunger having a chuck through which is fed the wire from which the contact point is formed. Thereupon said chuck presses the end of the wire against the surface of the work. In this position the wire and the work close the circuit between the electrodes of the secondary of a transformer, and while in this position the primary circuit of the transformer is momentarily closed by means of a switch and the point of the wire is thereby welded to the work by the resultant flow of current. Thereupon, while the work is held down, the plunger is raised, which latter operation is preferably employed as a means for feeding the wire through the plunger, the lower end of the plunger being provided with a feed-chuck. The wire is then cut between the weld and the end of the chuck by means of shears or the like. The carriage is then moved into position below a hammer, which thereupon strikes a blow upon the welded point, giving to the same the desired shape. The carriage is then returned to its initial position, ready to receive another piece of work to be operated upon. The work, after the contact has been given the desired form, is preferably automatically removed from the carriage. The movement of the carriage, and the operation of the plunger, the shears and the hammer may be controlled by a series of cams mounted on a rotary shaft. The work is preferably placed on the carriage by hand, though I have in some instances fed the work automatically to the carriage.

The several features of my invention may be more readily understood by reference to the accompanying drawings, in which—

Figure 2:
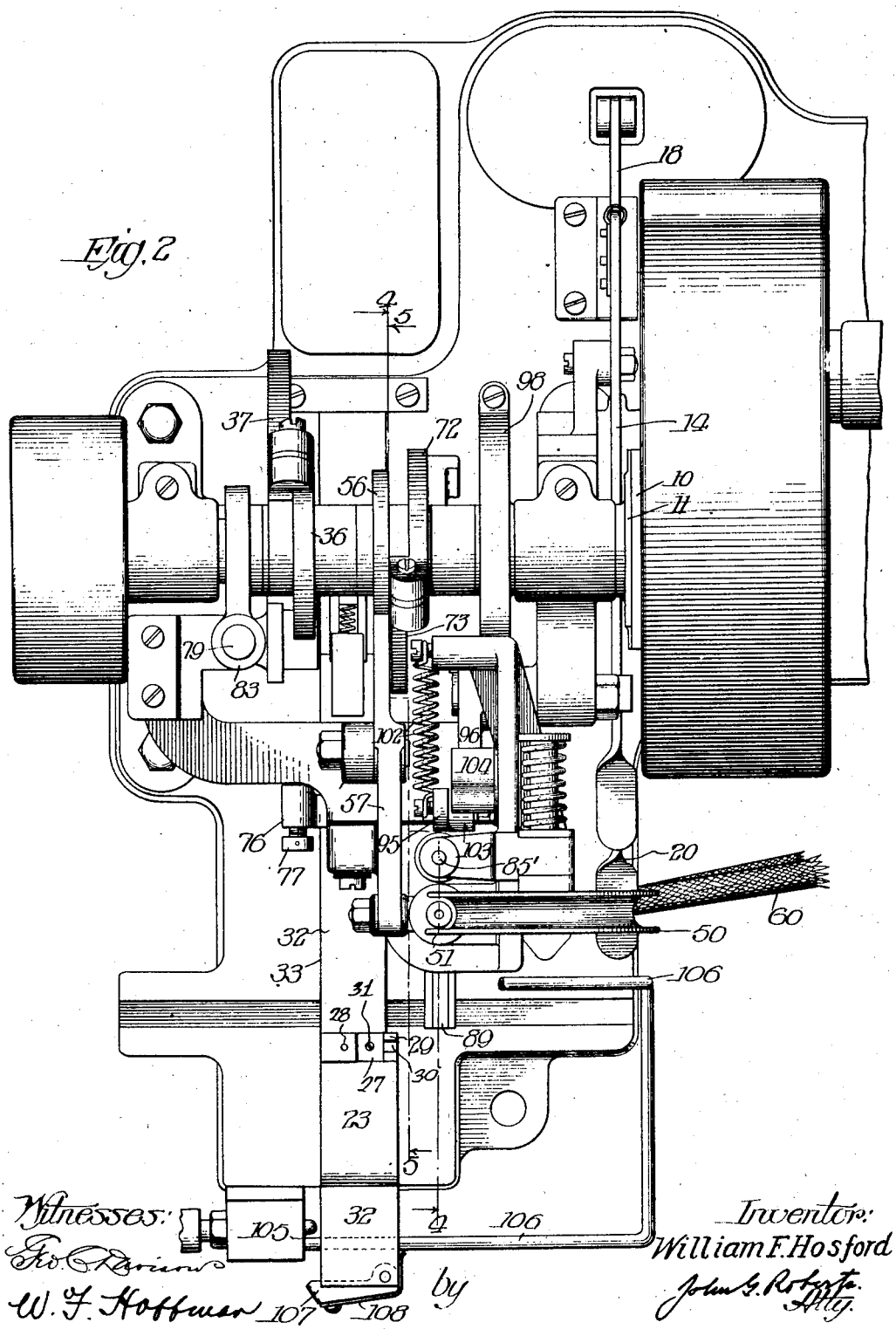
Figure 3:
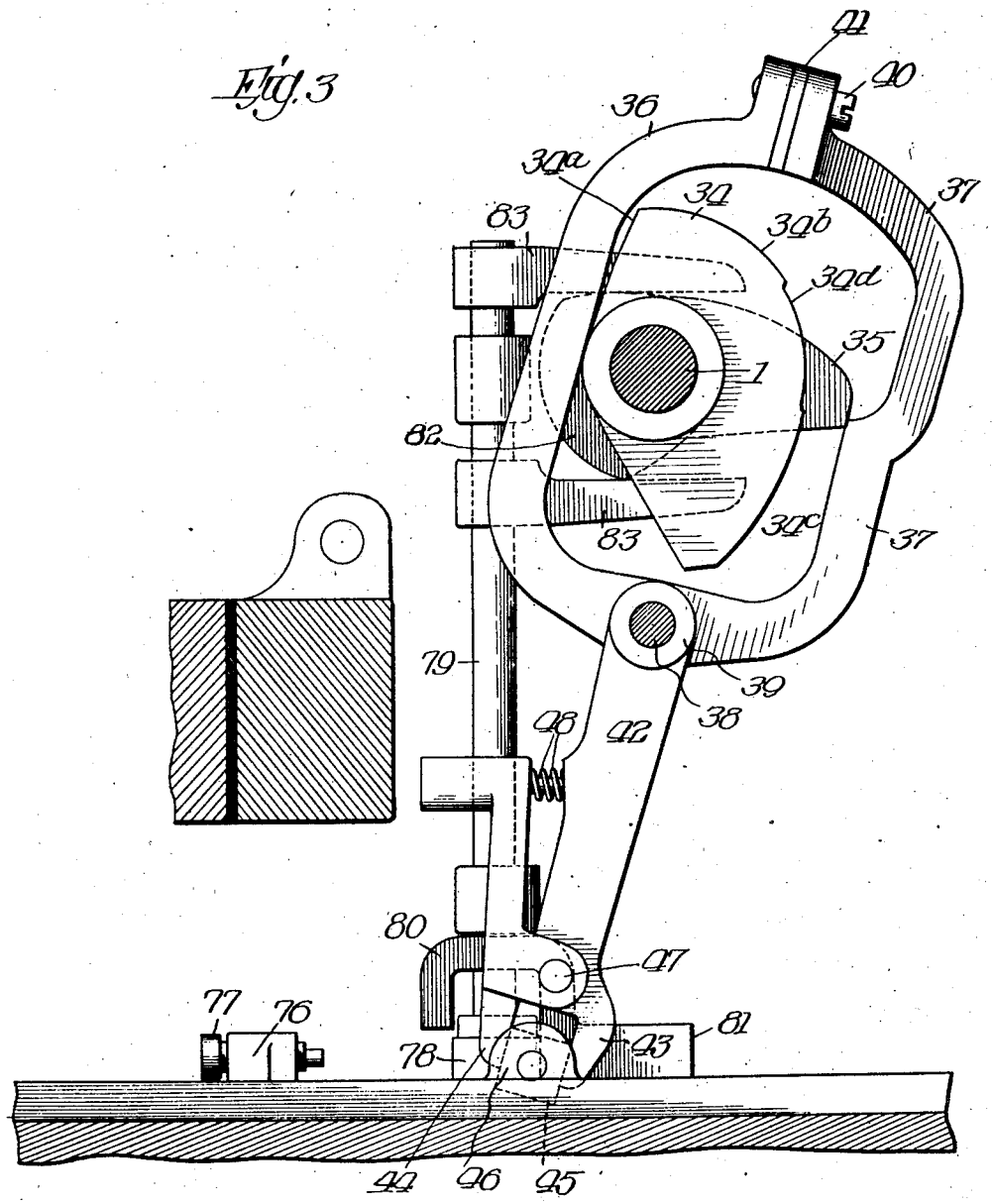
Figure 4:
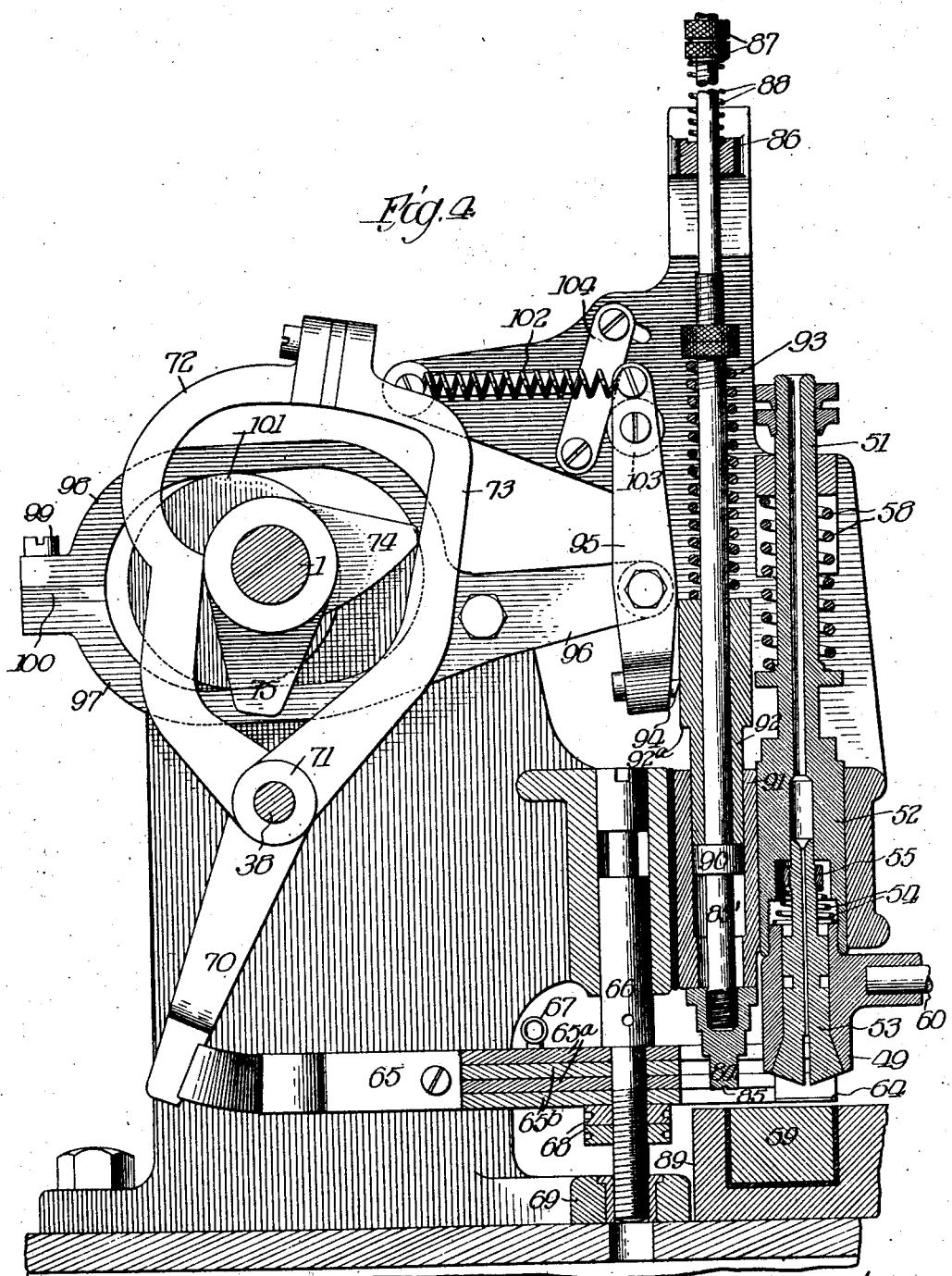
Figure 5:
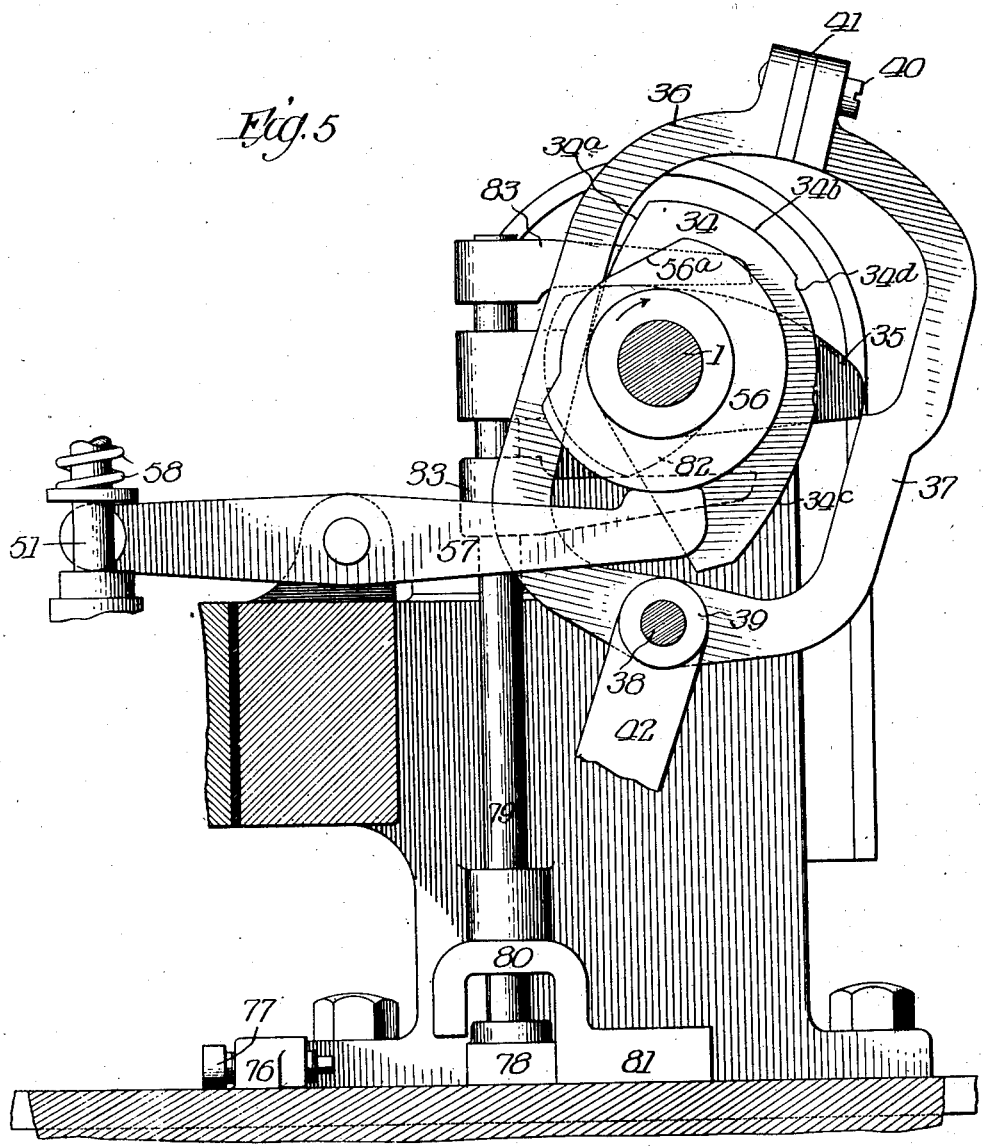
Figure 6:
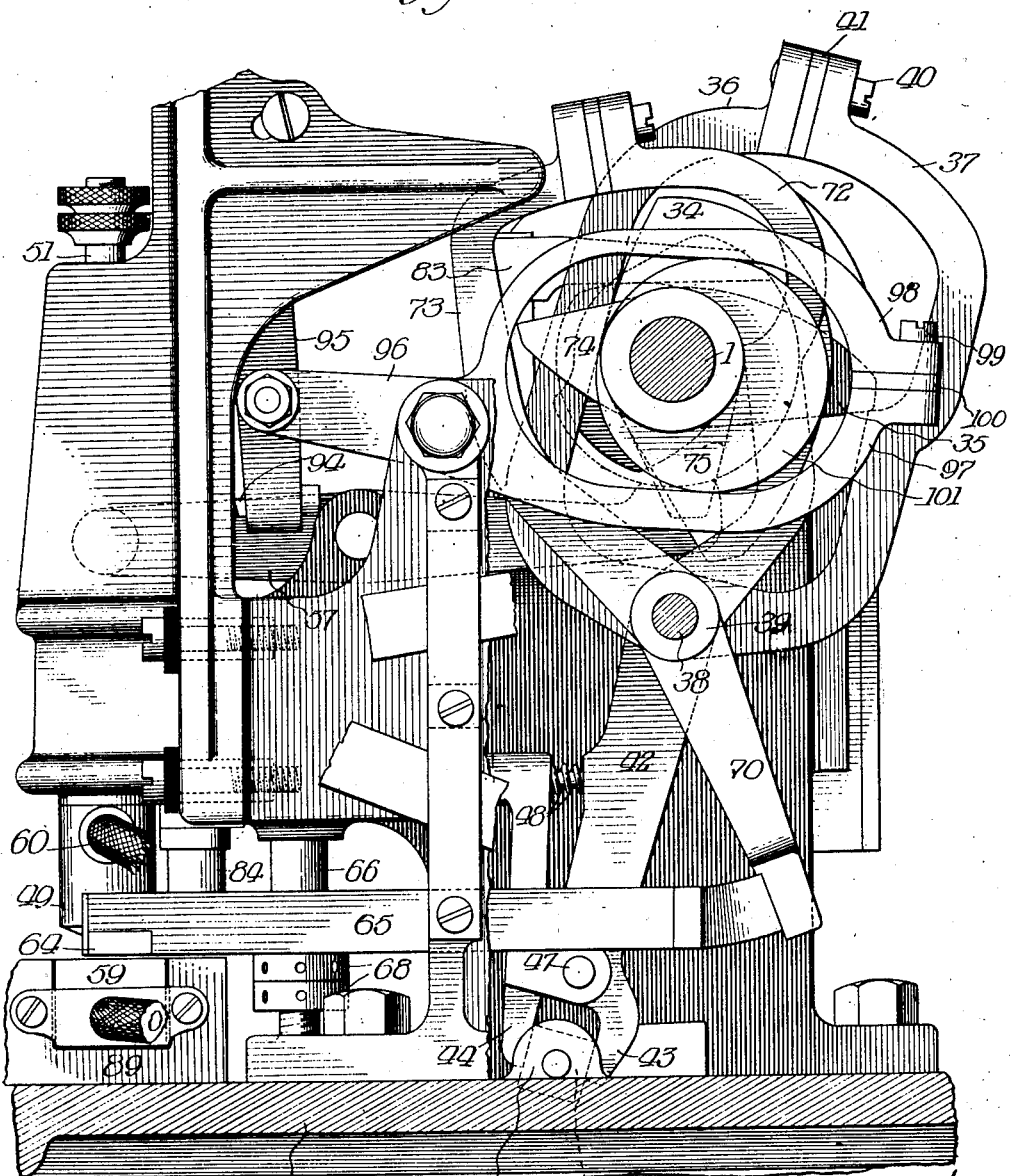
Figure 7:
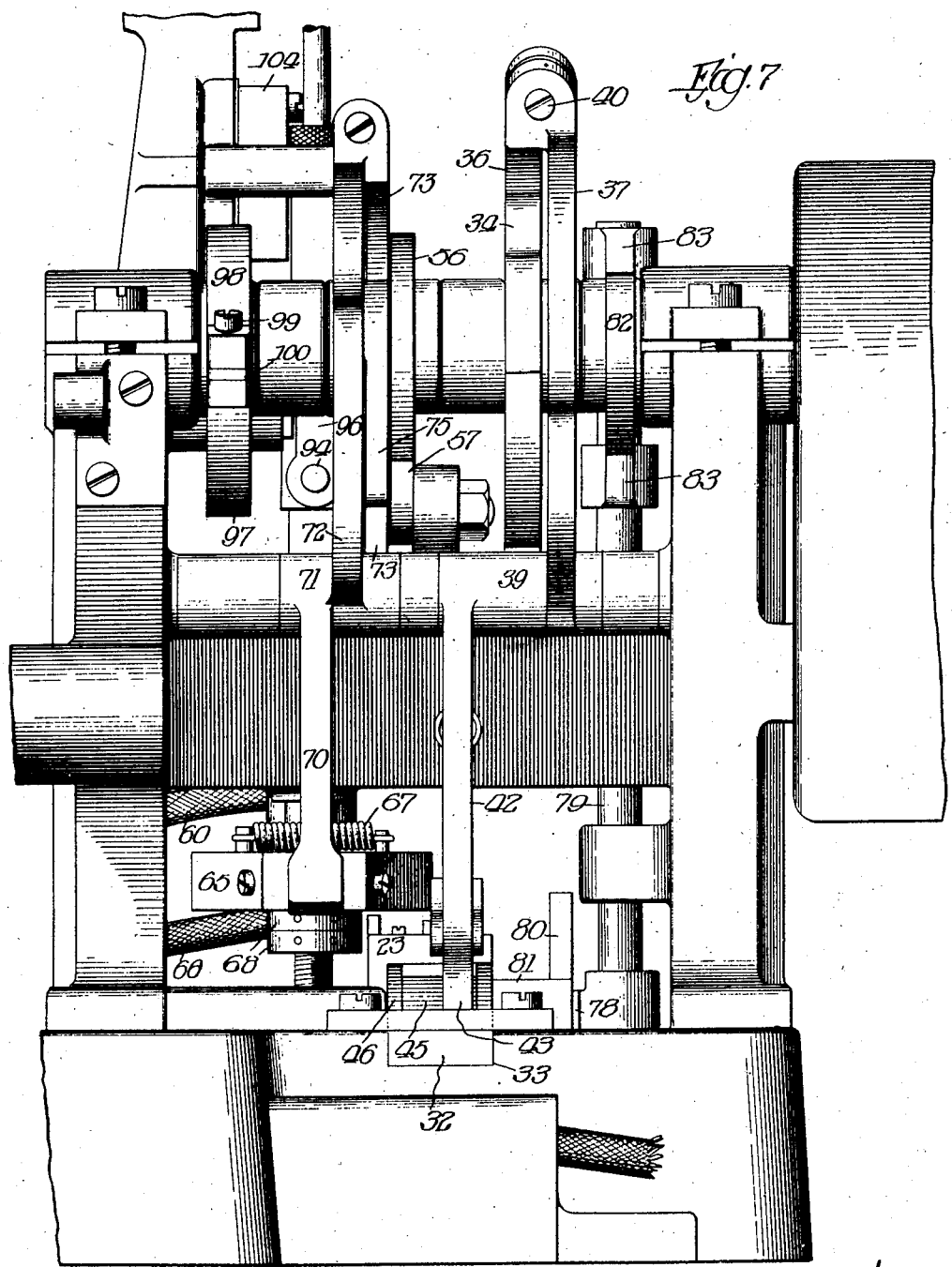
Figure 8:
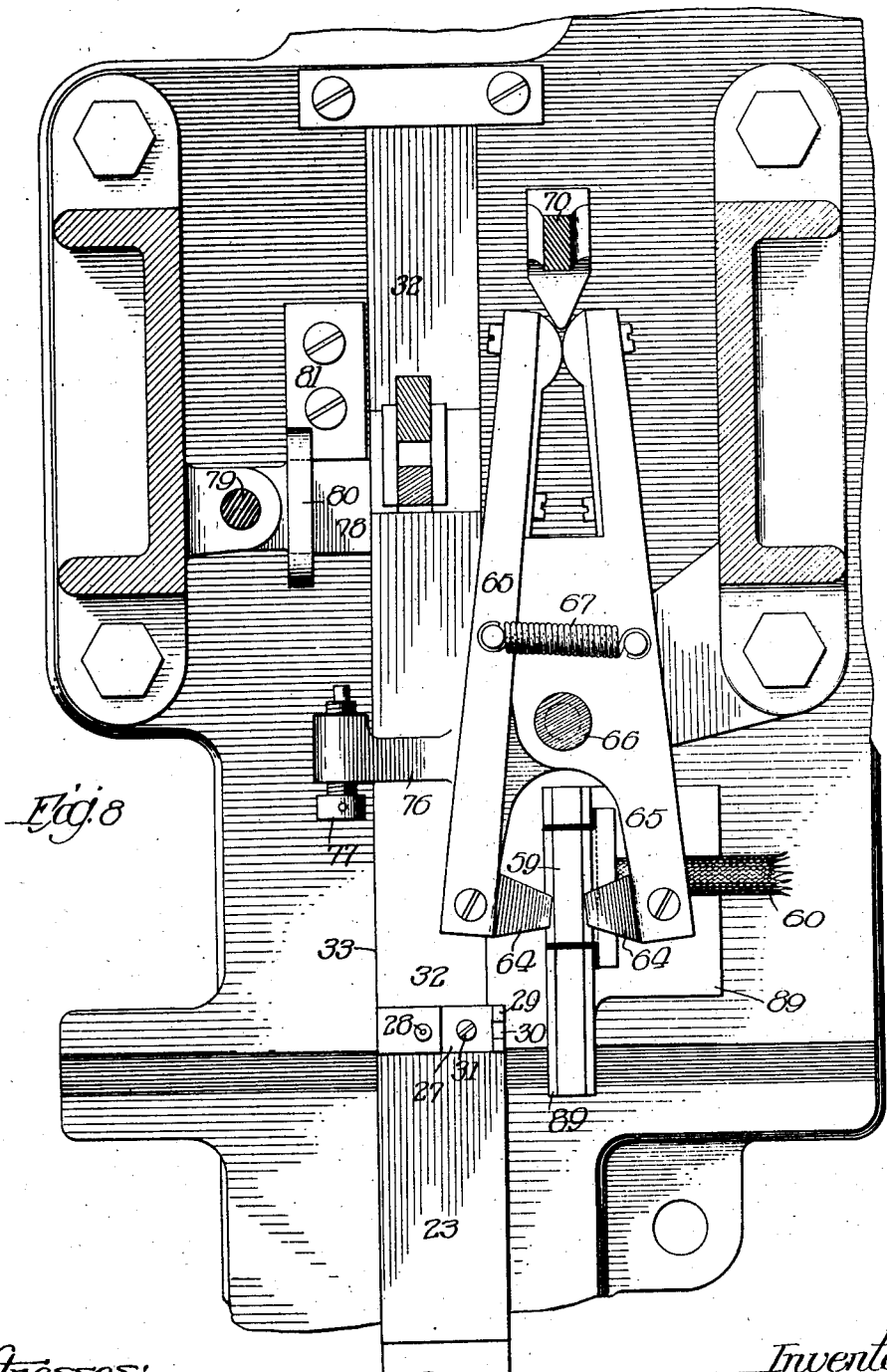

Figure 1 is a front elevation of a machine embodying my invention; Fig. 2 is a plan view of the machine; Fig. 3 is a view in end elevation of the reciprocating slide or carriage and of the cam and lever mechanisms for controlling the movements thereof, other parts being omitted for the sake of clearness; Fig. 4 is a vertical section on the line 4—4 of Fig. 2; Fig. 5 is a section on the line 5—5 of Fig. 2, that is, substantially on the same line as that of Fig. 4 but looking in the opposite direction; Fig. 6 is a fragmentary end elevation of the cam mechanism for controlling the sequence of operation of the machine, as viewed from the right hand end of the machine, parts being broken away and the cam shaft and the shaft upon which certain of the operating levers are pivoted being shown in section; Fig. 7 is a rear elevation of the machine; Fig. 8 is a horizontal section showing the wire-cutting shears and the reciprocating slide in plan; Fig. 9 is a diagrammatic view, illustrating the means for controlling the clutch that in turn controls the operation of the cam shaft, the parts being shown in position for continuous rotation of the cam shaft; Fig. 10 is a detailed view, partly in section and partly in side elevation of the clutch mechanism; Fig. 11 is a fragmentary view partly in section,—the carriage which supports the work, the upper electrode through which the wire is fed and the hammer which shapes the point of the contact being shown in side elevation; Fig. 12 is a perspective view, partly broken away, of the carriage; and Fig. 13 is a perspective view of one form of spring showing a contact point as welded thereon by the machine.

Similar letters of reference refer to similar parts throughout the several views.

The sequence of operation of the machine is controlled by a series of cams secured to a rotary shaft 1. Said shaft may be driven in any suitable manner, and for this purpose there is shown (see Fig. 1) an electric motor 2 geared to the shaft 1 through a series of gear wheels 3, 4, 5, 6, 7 and 8. The gear wheel 8 is loosely mounted on the shaft 1 and the hub 9 of said gear wheel constitutes one member of a clutch, the other member 10 of which is secured to the shaft 1. Referring more particularly to Figs. 9 and 10, the clutch member 10 is adapted to be thrown into operating engagement with the member 9 by a pin 11 which extends through a hole in the member 10. A leaf-spring 12, shown as a collar which surrounds the shaft 1, tends to press the pin 11 into one of the holes 13 in the clutch member 9, and thereby to couple together the two clutch members. Such clutching engagement of the members 9 and 10 is under the control of the two starting levers 14 and 20. The starting levers 14 and 20 so coöperate that they can be set to produce either continuous or intermittent rotation of the cam shaft 1. If continuous rotation of the shaft 1 is desired, the lever 20 is raised and the lever 14 is depressed, as illustrated in Fig. 9, in which figure the machine is shown as set for continuous operation. If it is desired that the cam shaft 1 make one revolution only for each depression of the starting lever 14, the lever 20 is first depressed and held in such depressed position in any suitable manner. The end 21 of the lever 20 then engages the extension 19 of a pivoted stop lever 18 and holds said lever 18, against the tension of a spring 17, out of the path of movement of the end of the lever 14. The spring 17 is secured at one end to an extension 16 of the lever 14 and at its other end is secured to a point beyond the pivotal point of the lever 18. The lever 14 is provided with a laterally extending cam finger 15 which, when the lever is elevated, projects into the path of movement of the radial extension 12ª of the spring 12 and moves said spring outwardly to the position shown in Fig. 10. Thus assuming that the lever 20 is in the depressed position, and the stop lever 18 thereby moved to the left of the position shown in Fig. 9, the momentary depression of the lever 14 releases the end 12ª of the spring, whereupon the pin 11 is projected into one of the openings 13, thereby clutching the shaft 1 to the constantly rotating wheel 8. Upon the lever 14 being released, the spring 17 raises the cam finger 15 of the lever 14 into the path of motion of the spring extension 12ª, and when the shaft 1 has made one revolution the extension 12ª rides over the cam finger 15 and draws the pin 11 out of the opening 13, thus uncoupling the clutch. Therefore when the lever 20 is depressed the cam shaft 1 makes but one revolution for each depression of the lever 14. However, if the lever 14 is depressed and the lever 20 raised, the spring 17 throws the stop lever 18 underneath the end of the lever 14, as shown in Fig. 9, thus preventing the lever 14 from returning the cam finger 15 to its raised position. With the levers 14 and 20 thus set the clutches 9 and 10 remain coupled together and the cam shaft 1 is continuously driven. Thus, when the lever 14 is operated, the shaft 1 and the various cams carried thereby begin to rotate, the rotation being continuous if the lever 20 is in its raised position, but ceasing at the end of one complete revolution if the lever 20 is in its depressed position.

The work, as for example a switch-spring, to which a contact is to be welded is placed upon a carriage (see particularly Fig. 12) preferably consisting of two plates 22, 23 hinged together at one end and having placed between them a cushioning spring 24. The rear end of the plate 23 is provided with a work support suitable for holding the particular form of spring or other work which is to be operated upon. For use in connection with the switch-spring shown in Fig. 13, consisting of a strip of metal 25 having an opening 26, the plate 23 may be provided with a work supporting block 27 having on its upper face a pin 28 which will extend in the opening 26 of the spring and thereby properly position said spring. The block 27 may also be pr vided with an end flange 29 having a channel 30 for receiving and holding the end of the spring. The work-support 27 is preferably removable from the block 23, being secured thereto by a screw 31. Thus a support 27 suitable for holding the switch-spring shown in Fig. 12 may be removed and a support suitable for holding other work substituted therefor.

The plate 22 of the carriage is secured in any suitable manner to a slide 32 which extends from the front to the rear of the machine, and which is located in a guideway 33 formed in the bed of the machine. The slide 32 is adapted to be given a reciprocatory motion by cams 34 and 35 (see particularly Figs. 3, 5 and 6) located upon the cam shaft 1, and arranged to engage the arms 36 and 37 respectively of a lever pivoted upon the cross-rod 38. Said lever is provided with a central hub or fulcrum 39 (see also Fig. 7) which surrounds the pivot rod 38. The lever arms 36 and 37 extend upwardly from said hub 39, in different planes and upon different sides of the cam shaft 1, being preferably secured together at their upper ends by a screw 40, thus constituting a loop which surrounds the cams 34 and 35. A spacing block 41 may be interposed between the ends of the arms 36 and 37 in order to provide for adjusting the arms to compensate for wear of the arms and the cams. The lower end of the lever is in the form of an arm 42, which, at its extreme lower end, is provided with grappling jaws 43, 44 for engaging with a rectangular block 45 which is pivoted between ears 46, 46 carried by the slide 32. The jaw 43 is integral with the arm 42, and the jaw 44 is pivoted to the arm 42 upon a pivot 47, said jaw being normally pressed into operative position by a spring 48. Thus, as the shaft 1 and the cams 34 and 35 carried thereby rotate, the lever arm 42 is actuated and imparts a reciprocatory motion to the slide 32.

The machine is shown in position ready to receive the work to which the contact is to be welded and ready to commence the cycle of operations required for welding a contact point upon the work. The work, as for example the switch-spring 25 (see Fig. 13) to which a contact point 25ª is to be welded is placed upon the carriage, and motion is imparted to the cam shaft 1 in the manner hereinbefore described, whereupon said carriage is moved a slight distance to the rear to bring the end of the spring 25 centrally beneath the upper electrode 49. This movement of the carriage is caused by the surface 34ª of the cam 34 engaging with the lever arm 36. When the cam has rotated so that the surface 34ᵇ of the cam is in engagement with the arm 36, the carriage remains stationary under the electrode 49 for the purpose of permitting the welding operation to be effected. The next step in the cycle of operation of the machine consists in presenting to the work the metal point which is to be welded thereto. The mechanism for accomplishing this welding operation can best be understood by reference to Figs. 1, 2, 4 and 11. In the machine illustrated this is effected by feeding to the work the end of a wire w, as for example, a platinum wire. Said wire is wound upon a reel 50 and is fed through the center of a hollow plunger 51 which is enlarged at its lower end 52 in which is threaded the upper electrode 49. The electrode 49 is hollow and incloses the chuck 53, which is provided with a central opening, in alinement with the opening in the plunger 51, for the passage of the platinum wire. The chuck 53 is held in position to grip the wire by a spring 54 which bears between the electrode 49 and an adjustable collar 55 carried by the stem of the chuck. Upon the carriage being brought in position below the electrode 49 the plunger 51 is lowered to present the end of the platinum wire to the work 25 carried by the carriage. The raising and lowering of the plunger is controlled by a cam 56 mounted upon the cam shaft 1. (See also Fig. 5.) Said cam bears upon the end of a pivoted lever 57, the opposite end of which is operatively connected to the plunger 51. As the surface 56ª of the cam 56 rides over the end of the lever 57, the plunger 51 is allowed to drop and the spring 58 presses the end of the wire held by the chuck 53 against the surface of the work 25, the jaws of the chuck at this time being forced into gripping engagement with the wire. The platinum wire which projects a short distance from the end of the chuck thus completes the electric circuit from the upper electrode 49 to the lower electrode 59 upon which the end of the spring 25 is then resting. The leads 60, 60 from the secondary of the transformer are secured to the upper and the lower electrode respectively. The leads 61, 61 from the primary of the transformer are attached to the switch-springs 62 and the switch-springs are closed and current thus momentarily turned on the primary of the transformer by means of the cams 63 carried by the shaft 1. The leads 60, 60 from the secondary of the transformer carry the current to the copper connecting block 59 and to the copper plunger 49 respectively. The end of the platinum wire is thus welded to the work 25 by the resulting momentary flow of current through the secondary of the transformer. As soon as the weld is made the plunger 51 is raised by the further rotation of the cam 56. Meanwhile the work 25 is prevented from being lifted by the shear-blades 64, or by any other suitable means, and hence when the plunger 51 is raised the amount of platinum required for making a contact point is drawn out from the end of the chuck 53, the grip of the chuck upon the wire being relaxed to a certain extent as the plunger is raised. Referring more particularly to Figs. 4 and 7, after the plunger 51 is raised, the shear-blades 64, 64 are operated to cut off the platinum wire, leaving attached to the spring the right amount for forming the contact point. The blades 64, 64 are mounted on the ends of the levers 65, 65 which are pivoted together upon a pivot post 66, the shear-blades 64, 64 being normally held apart by the spring 67. One of the levers 65 is provided with flanges 65ª, 65ª which overlap similar flanges 65ᵇ, 65ᵇ, of the other lever 65, the pivot post 66 passing through said flanges. The shears are vertically adjustable in order that they may be adjusted to cut off the desired amount of wire to form the contact. In order to accomplish this the shears are held on the pivot post 66 by clamping nuts 68 and said post is threaded at its lower end into a support 69, whereby the turning of the pivot post 66 will raise or lower the same and thereby adjust the shears to the proper height. The shears are operated by the lower arm 70 of a lever similar in construction to the lever hereinbefore described for operating the carriage slide. The hub or fulcrum 71 of said lever (see also Fig. 7) is pivoted upon the rod 38 and the upper end of the lever is provided with the two arms 72, 73 which encircle the cam shaft 1 and are adapted to be engaged by the cams 74, 75, respectively. The operation of the shears cuts the platinum wire as before stated, leaving the proper amount of platinum on the springs and leaving protruding from the end of the plunger 53 the same amount of platinum wire as before. After the wire is cut the slide 32 is shifted to the rear by the further rotation of the cam shaft. Before describing this next step of the cycle of operation, and referring more particularly to Figs. 5 and 8, attention is directed to the fact that the slide 32 is preferably provided with a bracket 76 which carries an adjustable pin 77 adapted, when the foot 78 is in its lowered position, to stop thereagainst and thus to bring the slide 32 to a stop with the spring 25 in exact position for the welding operation. The foot 78 projects laterally from the lower end of a plunger rod 79 and is guided in a guideway formed by an inverted U-shaped projection 80 of a block 81 secured to the bed of the machine. In order that the carriage 32 may be free to move to the rear after the weld is made, it is necessary that the foot 78 be raised, and this is accomplished by means of a cam 82 (shown in Fig. 3 and in Fig. 5) carried by the shaft 1, said cam acting upon arms 83, 83 which extend horizontally from the upper end of the plunger 79, above and below the cam 82. To guard against the pin 77 being pushed against the foot 78 while said foot is being raised, the cam 34 which controls the slide 32 may have a depression on its surface as indicated at 34$^d$. After the foot 78 is raised out of the way of the pin 77, the slide 32 is moved to the rear by the face 34$^c$ of the cam 34 engaging with the lever arm 36, by which movement the work 25 is advanced to a position underneath the hammer 84. The work or spring 25 is stopped in exact position for said hammer to operate upon the platinum point by reason of the fact that the pin 77 engages the stop block 81 and the carriage is thus prevented from being accidentally moved beyond its proper position. To insure that the pin 77 will press firmly against the foot 78 and the stop block 81 and thus accurately position the work beneath the welding plunger and the hammer, respectively, the jaw 44 is pivoted to the arm 42 and is acted upon by the compression spring 48 as hereinbefore described. It will be noted that in these positions the spring 48, operating on the jaw 44, is under compression, so that, even though there should be slight wear on the cams, their levers or the pivots thereof, the proper location of the work under the welding plunger and the hammer will not be affected.

The operating face of the hammer 84 may be given a contour adapted, when the hammer strikes the platinum point, to give the same any required contour. For instance, to form a conical point the operating face of the hammer 84 is provided with a conical depression 85.

Referring more particularly to Fig. 4, the hammer 84 is secured upon the lower end of a plunger-rod 85', the upper end of which is guided by a cross bar 86. The upper end of the plunger 85' is provided with an adjustable nut 87 between which and the cross bar 86 is placed a spring 88 from which the rod is supported. The hammer 84 is thus normally held in its elevated position above the anvil 89. The rod 85' is provided with a collar 90 which fits in a suitable guide 91. A slidable sleeve 92 surrounds the plunger 85' and is normally held against the collar 90 by the tension of the coiled spring 93. The sleeve 92 is adapted to be engaged at 92$^a$ by a pin 94 carried upon the lower end of a lever 95. The lever 95 is pivoted upon the end of an arm 96 of a lever, the opposite end of which has two branches 97, 98 which extend in the same plane upon opposite sides of the cam shaft 1. The two branches 97 and 98 of the lever are secured together at their ends by a screw 99 and the size of the loop formed by the branches 98, 99 may be regulated by a spacing block 100. The branches 97 and 98 thus form a loop or strap adapted to be actuated by the eccentric cam 101 mounted upon the shaft. The rotation of the cam 101 thus causes the lever arm 96 to be raised and lowered. This operation is so timed that while the contact point is being welded upon the work 25, the arm 96 is lowered, whereupon the spring 102 which is secured to the upper end of the lever 95 causes the pin 94 to engage at 92$^a$ with the sleeve 92. Further rotation of the cam 101 causes the lever arm 96 to be raised, thereby raising the sleeve 92 and compressing the spring 93. The roller 103 journaled at the upper end of the lever 95 is in contact with an adjustable track 104. This track 104 is so adjusted that after the sleeve 92 is raised to a suitable height, and after the contact point upon the work has been centered beneath the hammer 84, the upper end of the lever 95 is moved to the right, as viewed from Fig. 4, thus withdrawing the pin 94 from engagement with the sleeve 92. The spring 93 thereupon causes the sleeve 92 to strike a blow upon the collar 90, thereby operating the hammer 84. The blow of the hammer upon the contact point of the work 25 gives said contact point the desired contour, as, for example, that of the conical shaped point 25ª shown in Fig. 13. The work of forming a contact point upon the spring 25 is thus finished and the remainder of the cycle of operation consists in restoring the parts to their initial positions and in removing the spring from its supporting block 27. The slide 32 is returned by means of the cam 35 acting upon the lever arm 37, and at the end of one complete revolution of the cam shaft 1 the carriage will have returned to the position shown in the drawings. During the return movement of the slide 32 a finger 107 projecting laterally from the front end of the slide momentarily depresses a plunger 105 which controls the passage of compressed air through a pipe 106. This momentary blast of air blows the finished spring 25 from the block 27 and leaves the block ready for the reception of another spring. The finger 107 is carried by a spring 108 which permits of the finger 107 riding over plunger 105 without operating the same during the rearward movement of the slide.

It will be noted that the various cams located upon the cam shaft 1 so coöperate with their respective levers that after the parts actuated thereby have performed their functions the various parts of the machine at the end of a cycle of operation have been restored to their initial positions. Thus the cam 75 acts upon the lever arms 73 to withdraw the lever arm 70 from between the ends of the lever arms 65, 65 after the wire is cut, and the cam 82 permits the lowering of the foot 78 after the bracket 76 has passed to the front thereof upon the return stroke of the slide 32.

The following is a brief description of the operation of the machine: The work, as for example the switch-spring 25, is placed upon the support 27 of the reciprocating slide 32. Assuming that the lever 20 is locked in its depressed position, the depression of the lever 14 causes the clutch members 9 and 10 to couple the cam shaft 1 to the motor drive and said cam shaft makes one complete revolution. At the beginning of this rotation of the shaft 1, the cam 34 carried thereby engages the arm 36 of the carriage operating lever and rocks said lever, the lower end 42 of which is connected to the carriage slide 32. Said slide is thus moved to the rear, and the carriage is stopped beneath the upper electrode 49. This electrode is secured upon the lower end of a hollow plunger 51 through which the platinum or other suitable wire for forming the contact is fed, said wire being gripped by the chuck 53 inclosed by the copper electrode 49. The plunger 51 is lowered through the action of the cam 56 and the lever 57, whereby the end of the platinum wire is pressed against the surface of the switch-spring 25. Thereupon the circuit of the primary of the transformer is momentarily closed by cams located on the shaft 1, and the circuit of the secondary being closed through the platinum wire and the switch-spring 25, the end of the wire is welded to said spring. The plunger 51 is then raised, thereby feeding the wire through the chuck 53. The shear-blades 64 then cut the wire, said blades being actuated by a cam 74 which engages with the upper arm 72 of a lever and thrusts the lower wedge-shaped end 70 of the lever between the ends of the levers 65, 65 of the shears. After the wire is thus cut, leaving a point welded to the spring 25, the slide 32 is moved, by the action of the cam 34, farther to the rear and the carriage is brought to a stop with the welded point beneath the hammer 84. The hammer is operated to give a blow to the welded point by the eccentric cam 101 which first causes the lever 95 to be lowered while the weld is being made so as to engage with the sleeve 92 of the hammer-rod 85 and then to be raised. After the sleeve 92 has been raised a sufficient height, the lever 95 is tripped thus releasing the sleeve 92, whereupon the hammer strikes a blow upon the platinum point giving it the desired final shape. The cam 35 then acts upon the arm 37 of the slide operating lever and said slide is returned to its initial position and the cycle of operations is complete.

What I claim is:

1. The process of affixing contacts, which consists in welding the end of a platinum or other suitable wire to the part to which the contact is to be affixed, and cutting the wire so as to leave a portion thereof as a contact welded to said part.

2. The process of affixing contacts, which consists in pressing the end of a wire from which the contact is to be formed against the work upon which the contact is to be affixed; passing an electric current through the point of contact of the wire and the work, thereby welding the end of the wire to the work; and cutting the wire so as to leave a point of the wire welded to the work.

3. The process of affixing contacts, which consists in welding the end of a platinum or other suitable wire to the part to which the contact is to be affixed, cutting the wire so as to leave a portion thereof as a contact welded to said part, and then shaping the welded point to the desired shape.

4. In an electric welding machine, the combination with means for pressing contact-forming material against the surface of the work upon which it is desired to affix a contact, of means for passing a welding current through the point of contact of said contact-forming material and said work, thereby welding said contact-forming material to said work, and means for shaping the welded contact-forming material to the required form of contact.

5. In an electric welding machine, the combination with means for pressing a point of contact-forming material against the surface of the work upon which it is desired to affix a contact, of means for passing a welding current through said point, and means for shaping said point to the required form of contact.

6. In an electric welding machine, the combination with means for welding the end of a wire of platinum or other suitable contact-forming material to the work, of means for cutting the wire so as to leave the point thereof welded to said work.

7. In an electric welding machine, the combination with means for welding the end of a wire of platinum or other suitable contact-forming material to the work, of means for cutting the wire so as to leave the point thereof welded to said work, and means for shaping said point to a required form of contact.

8. In an electric welding machine, the combination with a pair of electrodes constituting the terminals of a source of welding current; of means for holding a platinum or other suitable wire in electrical connection with one of said electrodes and for pressing the end of said wire against the work while the same is supported in contact with the other electrode, thereby electrically welding the end of said wire to said work; and means for severing the wire so as to leave a portion thereof welded to the work.

9. In an electric welding machine, the combination with a pair of electrodes constituting the terminals of a source of welding current; of means for holding a platinum or other suitable wire in electrical connection with one of said electrodes and for pressing the end of said wire against the work while the same is supported in contact with the other electrode, thereby electrically welding the end of said wire to said work; means for severing the wire so as to leave a portion thereof welded to the work, and means for shaping said welded portion to a desired form of contact.

10. In an electric welding machine, the combination with a carriage for feeding the work, of means for pressing the end of a wire of platinum or other suitable contact-forming material against the surface of said work in one position of said carriage, means for passing a welding current through the point of contact of said wire and work, means for severing said wire to leave the point thereof welded to the work, means for shaping said welded point to the required form of contact in a subsequent position of said carriage, and automatically operated mechanism for effecting in proper sequence the movement of said carriage and the above mentioned operations.

11. In an electric welding machine, the combination with a carriage for supporting the work; of a pair of opposed electrodes between which the work is adapted to be carried by said carriage, said electrodes constituting the terminals of a source of welding current; a plunger provided with means for presenting the end of a platinum or other suitable wire between one of said electrodes and the work while said work is supported upon said other electrode; cutting blades adapted to cut the wire between said work and the end of said plunger, when said plunger is raised; and automatically operated means for effecting in proper sequence the movement of said carriage into position, the lowering and subsequent raising of said plunger, and the operation of said cutting blades.

12. In an electric welding machine, the combination with a carriage for supporting the work; of a pair of opposed electrodes between which the work is adapted to be carried by said carriage, said electrodes constituting the terminals of a source of welding current; a plunger provided with means for presenting the end of a platinum or other suitable wire between one of said electrodes and the work while said work is supported upon said other electrode; cutting blades adapted to cut the wire between said work and the end of said plunger, when said plunger is raised; a contact-shaping hammer beneath which said work is adapted to be positioned by said carriage; and automatically operated means for effecting in proper sequence the movement of said carriage to present the work between said electrodes, the lowering and the subsequent raising of said plunger, the operation of said cutting blades, the movement of said carriage to present the work with the welded point beneath the hammer, and the operation of said hammer.

13. In an electric welding machine, the combination with a pair of opposed electrodes constituting the terminals of a source of welding current, a chuck carried by said electrodes, a spring normally closing the jaws of said chuck into a yielding gripping engagement with a contact-forming wire, said jaws being arranged to tightly grip the wire when the end of the same is pressed against the work supported upon the opposed electrode, means for reciprocating said chuck carrying electrode toward and away from said other electrode, whereby the end of the wire is pressed against and welded to the work and the wire is then drawn through the chuck, and means for cutting the wire to leave the point thereof welded to the work.

14. In an electric welding machine, the combination with a stationary and a movable electrode constituting the terminals of a source of welding current, said movable electrode being in the form of a sleeve having an outwardly flaring mouth; a chuck fitting in said sleeve, the jaws of said chuck projecting beyond the mouth of said sleeve; a spring normally holding said jaws of the chuck into a yielding gripping engagement with a contact-forming wire; and means for reciprocating said movable electrode toward and away from said stationary electrode.

15. In an electric welding machine, the combination with a pair of opposed electrodes constituting the terminals of a source of welding current, one of said electrodes being in the form of a sleeve having an outwardly flaring mouth; a chuck fitting in said sleeve, the jaws of said chuck projecting beyond the mouth of said sleeve; a spring normally holding said jaws of the chuck into a yielding gripping engagement with a contact-forming wire; and means for imparting relative motion of said electrodes toward and away from each other.

16. In an electric welding machine, the combination with a hollow plunger for guiding a contact-forming wire; a sleeve secured upon the lower end of said plunger, said sleeve having an outwardly flaring mouth; a chuck fitting in said sleeve, the jaws of said chuck projecting beyond the mouth of said sleeve; a spring normally holding said jaws of the chuck into a yielding gripping engagement with a contact-forming wire; a support located beneath said plunger for receiving the work to which a contact is to be welded, said support and said sleeve constituting the electrodes of a source of welding current; and means for raising and lowering said plunger.

17. In an electric welding machine, the combination with means for welding contact-forming material to a switch-part, of means for shaping the welded contact-forming material into a contact, said means comprising a hammer having its face formed to give the required shape to the contact, and means for imparting a blow of said hammer upon said welded contact-forming material.

18. In an electric welding machine, the combination with welding and cutting mechanism whereby a sufficient portion for forming a contact is cut from contact-forming material and is left welded to a switch-part, of means for shaping said welded portion into a contact, said means comprising a hammer having its face formed to give the required shape to the contact, and means for imparting a blow of said hammer upon said welded portion.

19. In an electric welding machine, the combination with a carriage for supporting the work; of a pair of opposed electrodes between which the work is adapted to be carried by said carriage, said electrodes constituting the terminals of a source of welding current; means for accurately positioning said carriage for the welding operation; and means for welding a contact to the work supported upon said carriage.

20. In an electric welding machine, the combination with a carriage for supporting the work; of a pair of opposed electrodes between which the work is adapted to be carried by said carriage, said electrodes constituting the terminals of a source of welding current; means for welding a contact to the work supported upon said carriage; means for shaping the welded contact to the desired form; and means for accurately positioning said carriage for said welding and shaping operations.

In witness whereof, I hereunto subscribe my name this 7th day of October A. D., 1912.

WILLIAM F. HOSFORD.

Witnesses:
 DAVID LEVINGER,
 CHAS. F. DIETER.